Figure 1:
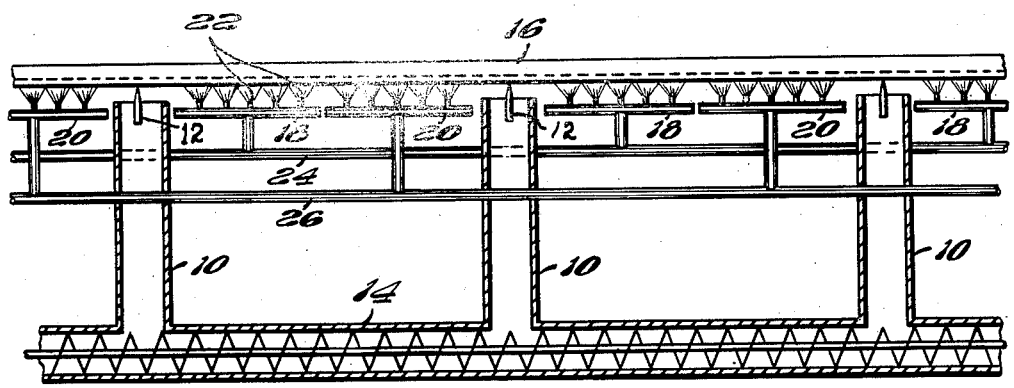

April 15, 1958 R. E. DOBBIN ET AL 2,830,879
AFTER TREATMENT OF CHANNEL CARBON BLACK
Filed March 10, 1955 2 Sheets-Sheet 1

INVENTORS
Rollins E. Dobbin
and Curt B. Beck
by Kenneth W. Brown, Atty

INVENTORS
Rollins E. Dobbin
and Curt B. Beck
by Kenneth W. Brown, Atty

United States Patent Office 2,830,879
Patented Apr. 15, 1958

2,830,879

AFTER TREATMENT OF CHANNEL CARBON BLACK

Rollins E. Dobbin and Curt B. Beck, Pampa, Tex., assignors to Godfrey L. Cabot, Inc., Boston, Mass., a corporation of Massachusetts Application March 10, 1955, Serial No. 493,389

7 Claims. (Cl. 23—209.8)

This invention relates to the aftertreatment of impingement carbon black and more particularly to a novel process for aftertreating such carbon black before removal of the black from the channel on which it is deposited. This invention is directed primarily to the production of color grade carbon blacks.

As described in U. S. Patents Nos. 2,013,774–5 of Wiegand, controlled oxidation of channel carbon black improves its color and workability in paint, lacquer, varnish, ink and the like. Wiegand achieves his objects by exposing channel black at elevated temperatures to an oxidizing atmosphere. One specific method for so doing involves the blocking out of some of the burner tips and heating the channel on the reverse side above those tips. As the channel slowly reciprocates fresh black is continuously exposed to the oxygen-rich atmosphere within the hot house while it remains in the area above the blocked out tips.

It is obvious that the method of that patent is quite inflexible in that only one set of conditions can prevail during the production of any given grade of black, and in that the extent of oxidation can be varied only by varying overall production conditions. If the drafting of the hothouse is changed, no slight undertaking in itself, to increase or decrease the volume of air flowing therethrough, or channel speed is altered to vary the residence time of the black on the channel, the extent of oxidation will change, but so will the quality of the black as first deposited. Thus, the amount and kind of treatment is limited to oxidation and is tied inescapably to black quality control exclusive of oxidation.

As the ink and protective coating industries have progressed so have their requirements for pigments. Specifications for carbon blacks used in ink and coating compounds have become ever more stringent so that the process of the above-mentioned Wiegand patent is now largely obsolete. Thus, betwen obsolescence and advances in the techniques of producing carbon black, particularly from gas enriched with oil as described in copending U. S. patent application, Ser. No. 205,522, filed January 11, 1951, now Patent No. 2,719,078, of Billings and Darwin, new methods of aftertreating channel black efficiently, economically and precisely have become essential in practice. Such a method is that of this invention.

It is the principal object of this invention to provide a novel process for aftertreating channel carbon black on the channel with gas of selected composition.

It is another object of this invention to provide such a process whereby the type and extent of aftertreatment can be precisely regulated and widely varied with ease and simplicity.

A further object is to provide a novel process for producing carbon black products having particular utility in inks and protective coatings.

These and the other objects of this invention are accomplished by flowing a selected treating gas against carbon black deposited upon the underside of the conventional reciprocating channels in zones located at intervals therealong and between groups of gas jets making carbon black. These treating zones are so positioned with respect to the carbon black make zones as always to lie in the direction of channel down travel from the make zones whereby the carbon black deposited on the channel will be carried from make to treat zone. Other steps include reversing the position of make and treat zones with each reversal in direction of channel travel and scraping the treated black from the channel before it can be exposed to make gas jets.

The treating gas may be any suitable gas which will react on the carbon black to produce the desired result. Such gas may be air alone or air mixed with an inert or combustible gas to provide an oxidizing, neutral or reducing atmosphere as desired. Most commonly air will be used alone or may be mixed with natural gas to provide a completely or partially combustible mixture. The volume of gas flow will in any given case be selected according to the extent of desired treatment.

It will, of course, be evident that the process of this invention is completely independent of the basic carbon black producing process. That is, the hothouses will be drafted and channel speed, fuel flows and tip distance will be selected in accordance with customary techniques for producing any given grade of carbon black.

Figure 2:
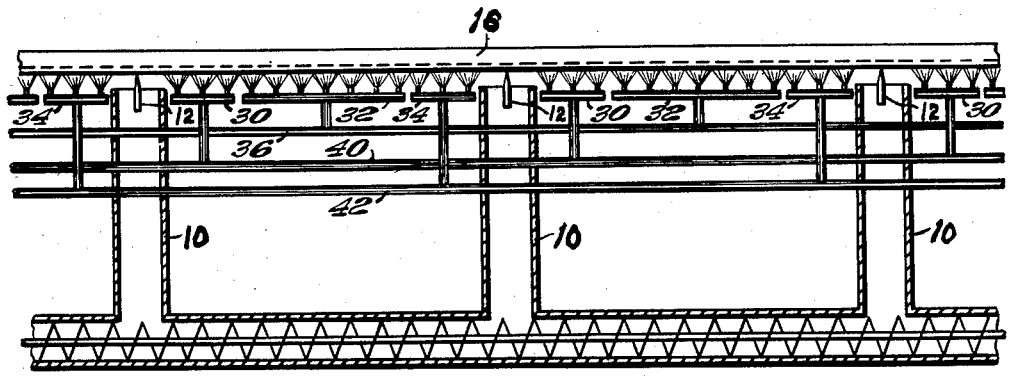
Figure 3:
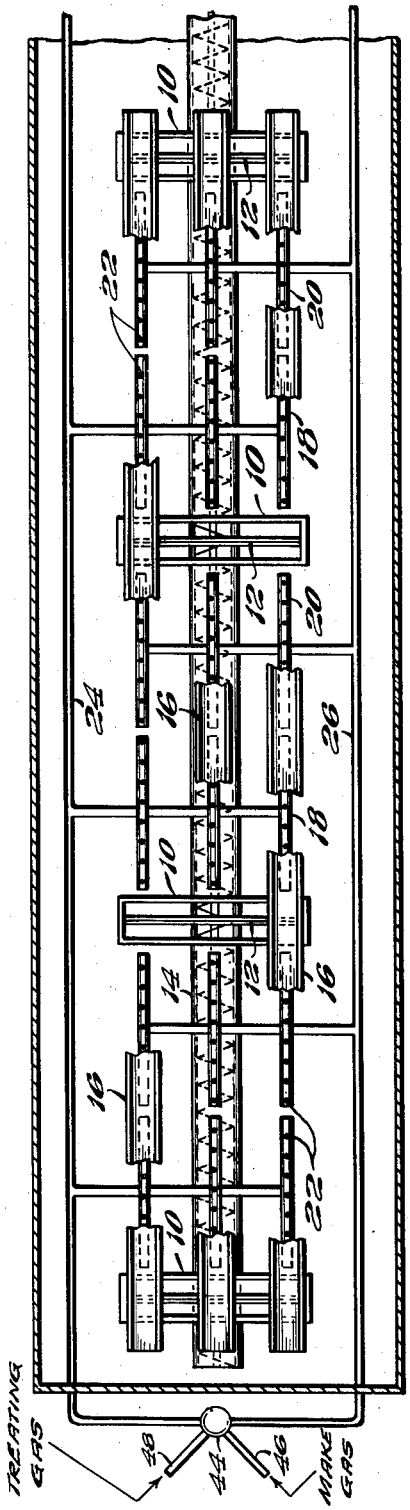

Our invention will be better understood and appreciated from the following more detailed description thereof taken in connection with the accompanying drawings in which Fig. 1 is a schematic view in side elevation of a fragment of a channel black producing unit showing one form of apparatus arrangement for the practice of the invention, Fig. 2 is a similar view showing a somewhat different form of burner pipe arrangement, and Fig. 3 is a plan diagram of a typical channel hot house taken above the channels and showing the piping layout of Fig. 1.

The construction of channel carbon black producing apparatus has changed substantially not at all over many years. The individual unit comprises a hothouse which is usually a building 140–200 ft. long and 8–14 ft. wide, containing a plurality of parallel slowly reciprocating channels suspended six feet or so above the ground and burner pipes equipped with a multiplicity of lava tips mounted along and several inches below the undersides of the channels. The burner pipes are connected through manifolds and supply pipes to a gas main and the gas distributed therethrough is discharged through lava or steatite tips, of which there are some 2000 to 3600 in each hothouse. Scrapers and carbon black collecting hoppers are provided at intervals along the lengths of the channels, and screw conveyors are provided to transport the black from the houses. Carbon black is produced therein by burning the jets of gas from each tip in air admitted beneath the side walls of the house and impinging the flame against the underside of the channel where it is quenched with deposition of black dissociated from the gas.

It is possible to produce many different grades or qualities of black in the channel process by selection of tip orifice size and shape, distance of tips from channel and from one another, volume of gas delivered thereto, volume of air admitted to the hothouse, speed of channel travel, etc. If any of these elements is changed the quality of the black likewise changes so that to effect aftertreatment of the black in the hothouse according to the above-identified Wiegand patents the producer must take the conditions necessarily prevailing therein as he finds them.

Referring now to Fig. 1 of the drawings, which shows one convenient arrangement of apparatus for the practice of this invention, each one of the plurality of make-treat sections in each hothouse is positioned between collecting hoppers 10 having associated scrapers 12 and being connected into screw conveyor 14 and extending to just below the underside of channel 16. Two sections of burner pipe 18 and 20 equipped with lava tips 22 extend for substantially the complete distance between the hoppers beneath the center of the channels. Pipe section 18 is connected into gas distributor pipe 24 and section 20 into distributor pipe 26 separately supplied with a gas as shown in Fig. 3.

An alternative piping arrangement is illustrated in Fig. 2. In this embodiment three burner pipe sections 30, 32 and 34 are provided with section 32 being connected into the natural make gas distributor pipe 36 in which gas flow is consistent and sections 30 and 34 being connected into distributor pipes 40 and 42, respectively, for alternation of supply. For example, make gas may be supplied to pipe sections 30 and treating gas to pipe sections 34 when channel 16 is travelling to the right and vice versa when the channel is moving to the left. Because of the extra piping required by the arrangement of Fig. 2 it is ordinarily not preferred to that of Fig. 1 which has the advantage of greater simplicity. However, greater delicacy of control can be achieved in the apparatus of Fig. 2 so may sometimes be employed. Other arrangements will, of course, suggest themselves to those skilled in the art in the light of this invention.

The schematic plan view, Fig. 3, is taken in the plane just above the channels and shows the arrangement whereby gas distributor pipes 24 and 26 are connected to make and treat pipe sections 18 and 20 and their duplicates throughout the hothouse. The distributor pipes 24 and 26 are connected into a suitable distributor valve 44 into which is also connected make gas supply pipe 46 and treating gas pipe 48. Valve 44 is so organized that on actuation it will transfer flow of each type of gas or mixtures thereof from one to the other of distributor pipes 24 and 26 as required.

The process as carried out in the apparatus shown in Figs. 1 and 3 proceeds as follows. While the channel 16 is travelling from left to right natural gas is delivered to pipe section 18 which thus functions as the make section in normal operation. At the same time treating gas is delivered to pipe section 20. While the channel continues to move in that direction carbon black made above pipe 18 is passed through the treat section above pipe 20 and is then scraped off by scrapers 12.

Actuation of valve 44 will, of course, be synchronized with channel travel. When the channel approaches the limit of its range of travel the valve will be operated to exchange gas flow between sections 18 and 20. Because of the heat prevailing in the hothouse and the proximity of open flames the tips newly supplied with make gas will quickly ignite. Provision may be made, if desired, to supply make gas for a short time simultaneously to both sections 18 and 20 to provide for overlap at the limit of each channel reciprocation. However, such timing arrangements involve mere mechanical details well within the coping abilities of those skilled in the art, as also is the selection of appropriate mixing, metering and regulating equipment.

As we have said, the treating gas will be selected according to the treatment required. Thus, this gas may be air or another gas alone or mixtures of air and gases. When high color, i. e., intense blackness, of the black is sought air alone may preferably be employed. When other qualities such as long flow, ease of working etc., in addition to increased depth of color is desired the treating gas will advantageously consist of a mixture of air and a combustible gas, e. g., natural gas in proportions selected according to the result sought. Selection of treating gas will in any case initially be determined empirically but thereafter will readily be reproducible. It is obvious that an almost infinite number of operating conditions can be established within the scope of the process of this invention.

The fact that channel carbon black can be modified by means of treatment with various gases at elevated temperatures is well established in the art. However, so far as we know, few attempts if any other than by Wiegand have been made to effect such treatment on the channels and Wiegand's process can, in the light of present day technology, be considered at best rudimentary.

In the following example is set forth data obtained from several runs made according to this invention.

*Example*

| Run | SB-25 | SB-235 | SB-306 | SB-242 |
|---|---|---|---|---|
| Make gas, MCF/day | 160 | 160 | 130 | 140 |
| Added oil, gals./hr | 4.8 | 6 | none | none |
| Treating gas, MCF/day | none | { gas 100<br>air 100 | none | { gas 98<br>air 100 |
| Treating to make time ratio | none | 0.6 | none | 0.6 |
| Black Properties: | | | | |
| Scale | 84.2 | 79 | 82 | 79.6 |
| Volatile, percent | 3.9 | 5.8 | 4.5 | 7.2 |
| Surf-area, sq.m./gm | 84 | 202 | 120 | 234 |

Having thus described our invention and preferred embodiments of means for carrying it out, we claim:

1. In the process for producing carbon black by impingement of hydrocarbon flames against reciprocating channels within a shelter, the improvement which comprises providing a series of impingement and treating zones in alternation with one another along and beneath the moving channels, burning a hydrocarbon gas under carbon black forming conditions in the impingement zones, thereby depositing carbon black on the channels, conducting a selected treating gas of composition different from that of the atmosphere in the shelter and in the impingement zones in independently regulated volume in contact in the treating zones with the carbon black previously produced in said impingement zones, thereafter scraping the treated carbon black from the channels and interchanging the positions of impingement and treating zones with each reciprocation of the channels.

2. The process of claim 1 in which the treating gas is air.

3. The process of claim 1 in which the treating gas is a mixture of air and another gas.

4. The process of claim 3 in which the other gas is selected from the group consisting of hydrogen and hydrocarbon gases.

5. A process for aftertreating channel carbon black on reciprocating channels within a hot-house which comprises burning a hydrocarbon gas under carbon black forming conditions therein in a plurality of make zones spaced apart along the underside of the channel, flowing in independently regulated volume a selected treating gas of composition different from that of the atmosphere of the make zones and within the hot house against the undersides of the channels in treating zones lying in the direction of channel downtravel from the make zones, conveying the black deposited in the make zones on the moving channels into the treating zones, therein reacting said treating gas upon the carbon black on the channels, removing the treated black from the channels before it is conveyed into the next succeeding make zones and reversing the relative positions of the impingement and treating zones with each reversal of direction of channel travel.

6. The process of producing after-treated impingement carbon black, characterized by the steps of moving a metallic surface first through a zone containing a carbon-forming flame burning in an atmosphere deficient in oxygen for complete combustion, thereby depositing carbon black on the surface, and then moving the surface with its deposited carbon black through another zone containing hot, oxygen-rich gas, thereby increasing the volatile content of the carbon black.

7. The process of producing after-treated impingement carbon black, characterized by the steps of depositing carbon black from a carbon-forming flame burning in an oxygen-containing atmosphere against a relatively cool metallic surface, moving the surface with the deposited and undisturbed carbon black thereon away from the flame, and altering the volatile content of the carbon black by treating in a hot atmosphere containing oxygen-rich gas while the carbon black remains in undisturbed distribution on the said metallic surface.

References Cited in the file of this patent

UNITED STATES PATENTS

| | | |
|---|---|---|
| 2,013,774 | Wiegand | Sept. 10, 1935 |
| 2,479,708 | Amon | Aug. 23, 1949 |